(12) United States Patent
Subramani et al.

(10) Patent No.: US 10,657,476 B2
(45) Date of Patent: *May 19, 2020

(54) JUST IN TIME COMPILATION (JIT) FOR BUSINESS PROCESS EXECUTION

(71) Applicant: TIBCO Software Inc., Palo Alto, CA (US)

(72) Inventors: Suresh Subramani, San Jose, CA (US); Pranab K. Dhar, Santa Clara, CA (US); Alan Amaya, Palo Alto, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,411

(22) Filed: Apr. 16, 2019

(65) Prior Publication Data

US 2019/0244151 A1 Aug. 8, 2019

Related U.S. Application Data

(63) Continuation of application No. 15/344,138, filed on Nov. 4, 2016, now Pat. No. 10,311,392, which is a continuation of application No. 13/975,000, filed on Aug. 23, 2013, now Pat. No. 9,519,879.

(60) Provisional application No. 61/693,181, filed on Aug. 24, 2012.

(51) Int. Cl.
*G06Q 10/06* (2012.01)
*G06F 8/41* (2018.01)
*G06F 8/65* (2018.01)
*G06F 9/455* (2018.01)

(52) U.S. Cl.
CPC ......... *G06Q 10/06316* (2013.01); *G06F 8/41* (2013.01); *G06F 8/65* (2013.01); *G06F 9/45516* (2013.01); *G06Q 10/067* (2013.01)

(58) Field of Classification Search
CPC ............ G06Q 10/00–50/00; G06F 1/00–21/00
USPC ................................................ 705/7.11–7.42
See application file for complete search history.

(56) References Cited

U.S. PATENT DOCUMENTS

| | | | | |
|---|---|---|---|---|
| 5,937,406 A | * | 8/1999 | Balabine | G06F 16/10 |
| 6,253,369 B1 | | 6/2001 | Cloud et al. | |
| 6,530,075 B1 | | 3/2003 | Beadle et al. | |
| 6,718,535 B1 | * | 4/2004 | Underwood | G06F 9/451 |
| | | | | 717/101 |
| 7,412,399 B1 | | 8/2008 | Racca et al. | |
| 7,613,997 B2 | * | 11/2009 | Kaler | G06F 17/2229 |
| | | | | 715/234 |

(Continued)

OTHER PUBLICATIONS

Pisupati, Bhanu N., A Virtual Filesystem Framework to Support Embedded Software Development Indiana University, Jun. 2007.

(Continued)

*Primary Examiner* — Alan S Miller
(74) *Attorney, Agent, or Firm* — McGuireWoods LLP

(57) ABSTRACT

Techniques to provide and deploy a business process are disclosed. A business process source filed stored in a memory is received. The business process source file, as stored in memory, is provided as an input to an in-memory compiler. A business process class file stored in the memory is received as output from the in-memory compiler. The business process class file, as stored in memory, is provided to a business process engine class loader.

20 Claims, 6 Drawing Sheets

(56) References Cited

U.S. PATENT DOCUMENTS

| | | | |
|---|---|---|---|
| 7,665,080 B2* | 2/2010 | Spotwood | G06F 9/445 713/2 |
| 7,739,316 B2* | 6/2010 | Thompson | G06F 16/284 707/825 |
| 8,601,450 B2 | 12/2013 | Su | |
| 2001/0011196 A1 | 8/2001 | Nagaoka et al. | |
| 2002/0038217 A1* | 3/2002 | Young | G06Q 10/063114 705/7.15 |
| 2003/0177480 A1 | 9/2003 | Arkwright et al. | |
| 2003/0208743 A1* | 11/2003 | Chong | G06F 8/10 717/106 |
| 2004/0078373 A1 | 4/2004 | Ghoneimy et al. | |
| 2005/0044537 A1 | 2/2005 | Zatloukal | |
| 2006/0010372 A1* | 1/2006 | Kaler | G06F 17/2229 715/255 |
| 2006/0074732 A1 | 4/2006 | Shukla et al. | |
| 2006/0074733 A1 | 4/2006 | Shukla et al. | |
| 2006/0184926 A1 | 8/2006 | Or et al. | |
| 2007/0038697 A1* | 2/2007 | Zimran | G06F 16/1827 709/203 |
| 2007/0150329 A1 | 6/2007 | Brook et al. | |
| 2008/0120129 A1 | 5/2008 | Seubert et al. | |
| 2008/0307392 A1 | 12/2008 | Racca et al. | |
| 2009/0164985 A1 | 6/2009 | Balko et al. | |
| 2009/0249312 A1 | 10/2009 | Liao et al. | |
| 2011/0088011 A1 | 4/2011 | Ouali | |
| 2012/0060150 A1 | 3/2012 | Pechanec et al. | |
| 2013/0041925 A1 | 2/2013 | Balko | |
| 2013/0117064 A1 | 5/2013 | Sadeghi et al. | |

OTHER PUBLICATIONS

Virtual File System definition Wikipedia.org, Retrieved Jan. 4, 2016.
Bloomfield, Aaron, Introduction to Compilation CS 415, Fall 2005.
Collber, Christian, CSC 453: Compilers and Systems Software Department of Computer Science University of Arizona, 2009.
Cramer, Timothy et al., Compiling Java Just in Time IEEE Micro, 1997.
Chapter 3: Assembling and Deploying J2EE Applications Sun Microsystems, 2004.
An Introduction to Java Class Loaders Indic Threads, Apr. 7, 2005.
Friesen, Jeff, Java 101: Packages organize classes and interfaces JavaWorld, Sep. 6, 2002.
Rouse, Margaret, What is just-in-time compiler (JIT)? WhatIs.com, Apr. 2005.
Just-in-time compilation definition Wikipedia.org, Retrieved Aug. 18, 2015.
Allen, Scott Authoring Workflows OdeToCode.com, Mar. 26, 2006.
Williamson, Alan, Understanding the Java Classloading Mechanism Java Developers Journal, 2004.
David J Biesack, Create Dynamic Applications with Javax.tools, Dec. 11, 2007, pp. 1-10.

* cited by examiner

US 10,657,476 B2

JUST IN TIME COMPILATION (JIT) FOR BUSINESS PROCESS EXECUTION

CROSS REFERENCE TO OTHER APPLICATIONS

This application is a continuation of patent application Ser. No. 15/344,138 filed Nov. 4, 2016 which is a continuation of Ser. No. 13/975,000, filed Aug. 23, 2013, which claims priority to U.S. Provisional Patent Application No. 61/693,181, filed Aug. 24, 2012, all of which are incorporated herein by reference for all purposes.

BACKGROUND OF THE INVENTION

A "business process" is a collection of related, structured activities or tasks that produce a specific result typically associated with providing a service or product for a particular customer or customers. A business process often can be visualized with a flowchart as a sequence of activities with interleaving decision points or with a process matrix as a sequence of activities with relevance rules based on the data in the process.

A business process engine is an execution framework for a given business process template, which may be depicted by aBusiness Process Model and Notation (BPMN) diagram. For example, a BPMN representation of a business process may be created by a designer of the business process. The BPMN representation may then be used to generate source code to implement the business process, e.g., by providing a template that can be used to create operable instances of the business process.

A process instance is an executing instance of the process template and may be invoked using different invocation contexts, e.g., message events, user invocation, etc. Each instance upon invocation typically is given contextual input data on which the process activities/task will operate on. The contextual data may be associated with a single or multiple process instances.

A process engine is responsible for the invocation of a process instance, its state and life-cycle management. During execution a process instance maintains its state and life-cycle information in the runtime engine and process data structures.

From time to time, a business process definition or model may need to be updated, replaced, superseded, etc. It may be necessary or desirable to update a business process definition quickly, and to have such an update implemented at a remote system one or more attributes of which may not be known to a developer of the updated business process definition.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
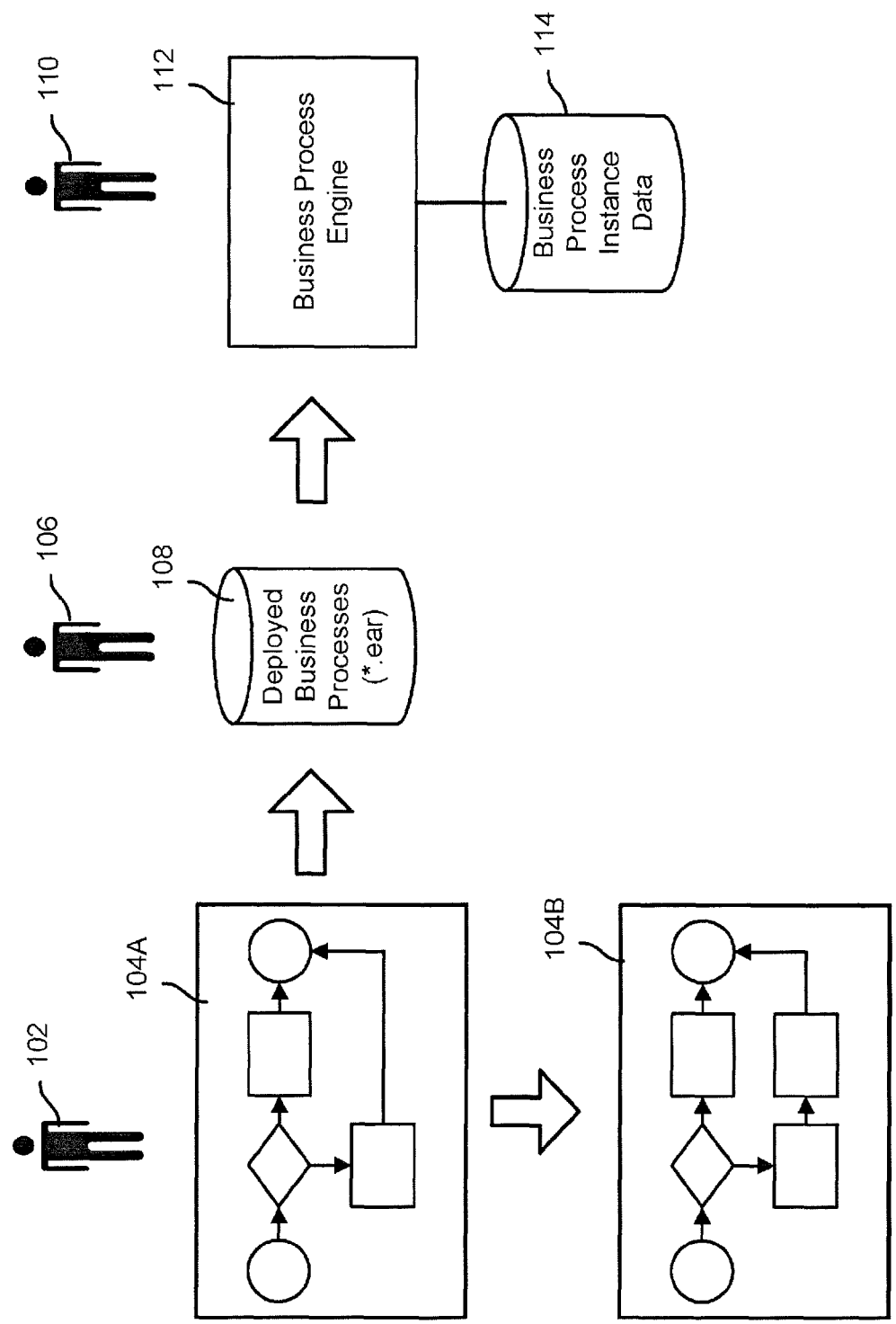
FIG. 1 is a block diagram illustrating an embodiment of a system that uses just in time compilation to deploy updated business processes.

FIG. 1 is a block diagram illustrating an embodiment of a system that uses just in time compilation to deploy updated business processes. In the example shown, just in time (JIT) compilation is used in various embodiments to provide and execute business processes.

In various embodiments, a business analyst 102 defines a business process (template) 104A, for example using an automated business process definition tool. A structured representation of the business process template (or model) 104A, such as an XMI Metadata Interchange) or other format, is created and saved. A business process deployment technician 106 uses the business process template (XMI or other), configuration data, and/or other information to deploy the business process, in the example shown by creating and storing in a data storage 108 an archive file, in this example a JAVA Enterprise Archive (.ear) file that includes the modules and/or information needed to deploy the business model on an application server. A business process administrative user 110 uses the archive to deploy the business process, e.g., to create and run instances thereof, on an application server, such as the business process engine 112 shown in FIG. 1. Business process instance data for respective instances of the business process are is stored in a data storage 114.

In various embodiments, the archive stored in storage 108 includes a definition of the business process, and component processing tasks, in a language that in prior approaches would be interpreted at runtime to provide and execute processing associated with business process instances. Typically, compiled code executes much more quickly and efficiently than interpreted code. However, business process definition code cannot be compiled ahead of time, e.g., by a developer prior to deployment of the code, if key attributes (e.g., operating system, file system, etc.) of the system to which the code is to be deployed and executed (e.g., business process engine 112 of FIG. 1) are not known at business process code development time.

Just in time compilation ("JIT" or "JIT compilation") of business process definitions, to enable business processes to be executed by running compiled code instead of by interpreting instructions at runtime, even if key attributes of the system at which the code will be compiled are not known at development time, is disclosed. In various embodiments, the administrative user 110, using business process engine 112, selects a deployed business process template, e.g., a stored .ear or other archive, unpacks the archive, and for each of at least a subset of components that include code that would otherwise have to be interpreted at runtime (e.g., process definition, processing tasks), a compiled version of the component is generated. For example, in some embodiments, a Java binary (i.e., byte code) or other compiled representation is created. In some embodiments, if a byte code or other intermediate compiled representation is created, further just in time compilation to provide machine code may be performed.

Referring further to FIG. 1, in the event the business analyst creates a subsequent version of the business process template, such as version 104B in the example shown, which includes an additional task in the lower execution path, the updated template is deployed as a new version of the business process template, which the business process engine (or other application server) recognizes as a new version of the business process, the (modified) process and/or tasks of which are compiled just in time to generate associated byte code for execution of business process instances associated with the new version of the template.

Use of just in time compilation as described herein provides improved runtime performance, as compared to interpreting instructions at runtime, and enables JIT to be used for business process execution in a way that does not complicate migration to subsequent versions of the application server (in the example in FIG. 1, the business process engine). For example, if the business process definition were compiled into byte code as stored in the .ear or other archive, after upgrade to a new version of the application server the previously compiled byte code may not execute correctly on the upgraded server. However, if as described herein the compiled code is generated by the application server at runtime, on upgrade new byte code (or other compiled code) suitable for execution by the upgraded application server would be generated, if needed. In some embodiments, the approach described herein would be more secure than storing compiled code in the .ear or other archive, because any change to the archive would be detected by the application server, resulting in a maliciously altered business process definition being treated as a subsequent version of the business process template, which would result in existing instances of the process, created prior to the attack, not being affected by the malicious changes.

Figure 2:
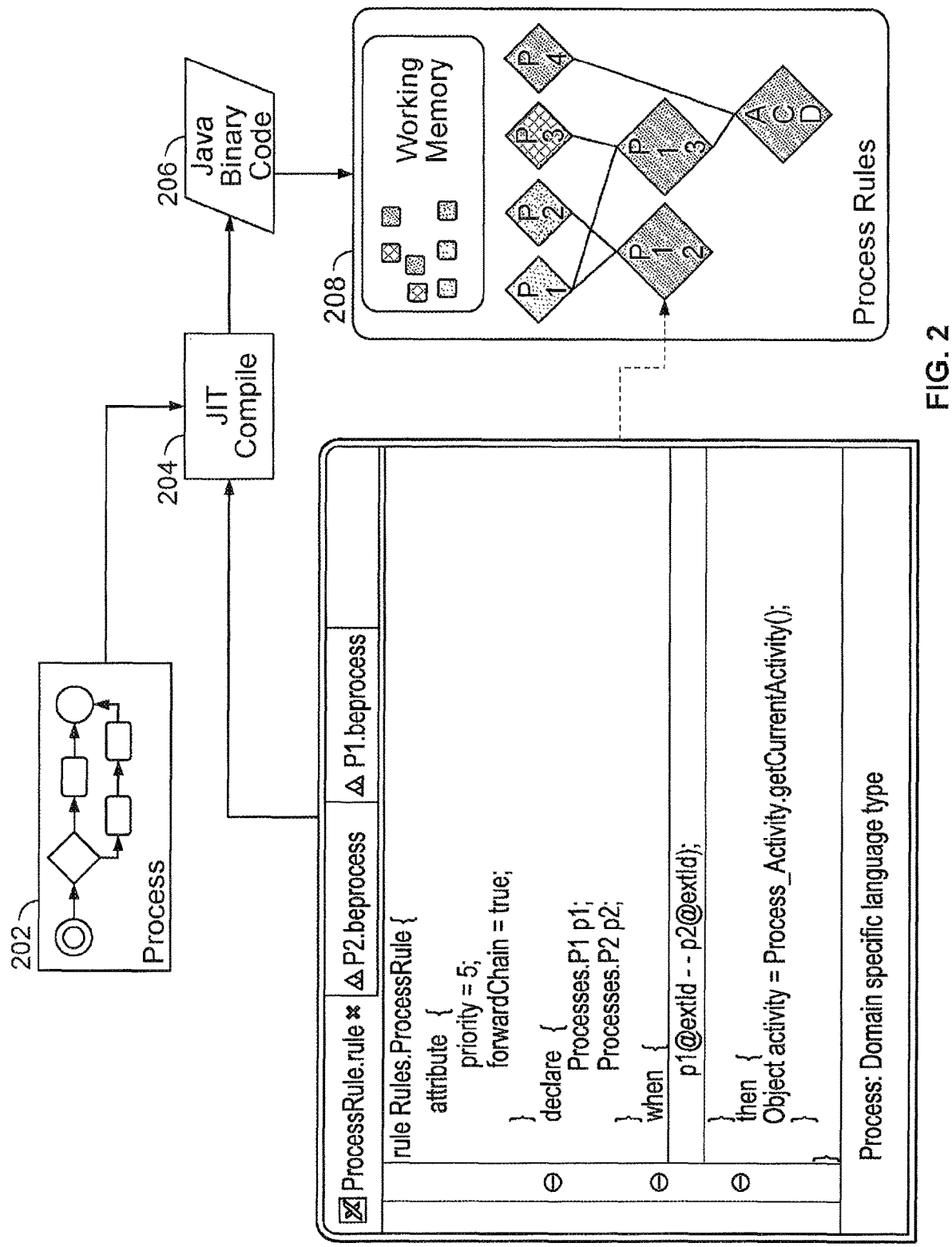
FIG. 2 is a block diagram illustrating an embodiment of a system that uses just in time compilation to deploy updated business processes.

FIG. 2 is a block diagram illustrating an embodiment of a system that uses just in time compilation to deploy updated business processes. In the example shown, JIT compilation 204 of a process 202 is used to generate Java binary code 206 for business process execution in a system in which a business process instance and associated state may be represented as "facts" and associated processing tasks configured to be applied as "rules" by a rules engine 208 configured to execute business processes.

In various embodiments, business rules engine 208 executes one or more business rules on facts stored in a working memory. Business rules engine 208 evaluates one or more business rules/rule sets on facts asserted from the process "business rules" task and may impact other rules/rule sets and facts without isolation in the working memory.

The business rules engine 208 may be a software system that executes one or more business rules in a runtime production environment. The rules engine allows assertion of facts to the working memory where rules correlate facts based on the rule criteria which are fact filters and facts joins between different types of facts. The Business Process Model (BPM), e.g., process 202, by definition is a template collection of related, structured activities or tasks. The runtime process is an instance created from a process template (e.g., JIT compiled 204 Java binary code 206) and a process context data is associated with it which is available to the individual process tasks and activities during its lifetime. A process engine is responsible for the invocation of a process instance, its state and life-cycle management. During execution a process instance maintains its state and life-cycle information in the runtime engine and process data structures.

The structure of the model and state of a business process model instances i.e. the process instance representing a business process context can be represented as a fact and the business process as a set of business rules linking the current state of a business process context to a possible future state, business processes can be executed on a complex event processing (CEP) engine like TIBCO BusinessEvents™. As an example, two independent online product orders that are destined for the same delivery address could be merged before shipping.

The relationships between multiple processes can be inferred using the contextual state and data exposed by the process as a "fact". The process instance facts can be evaluated using rules in a rules/inference engine and the rules can be used to control and dynamically modify process execution patterns in contrast to a statically defined process execution model. The inference can be done on multiple executing processes without the relationship connections having been specified explicitly a priori, and the relationships allows the processes to be invoked, terminated, executed efficiently and accurately.

In various embodiments, the process is represented as fact in a rules engine execution context using domain specific language (DSL) constructs. The process meta-model is used as a data type in the user specified DSL where its attributes and verbs can be programmatically inferred and modified to suit business needs. The process fact can then be asserted to a Business Rules Engine and rules can infer process state and life-cycle data, process context data and make business decisions.

In various embodiments, the inter-process inference rules, which correlate multiple Process Facts, are dynamic in nature as they can be deployed on demand and the rules are capable of exercising a life-cycle control over executing process instances, which match the correlation. The dynamic deployment of a control mechanism over existing rules in a secure manner is made possible in various embodiments by JIT compilation 204. For example, if processes were to manage a chemical plant or a prison system, dynamic override control over processes can be used for ordered shutdown or lockdown purposes.

In various embodiments, the execution model states that the Rules and Facts are compiled to Java binary code 206 just before execution, as described above, thereby providing performance optimization, easy deployment, and versioning of process models, while multiple instances of process versions remain in execution pending their completion.

Figure 3:
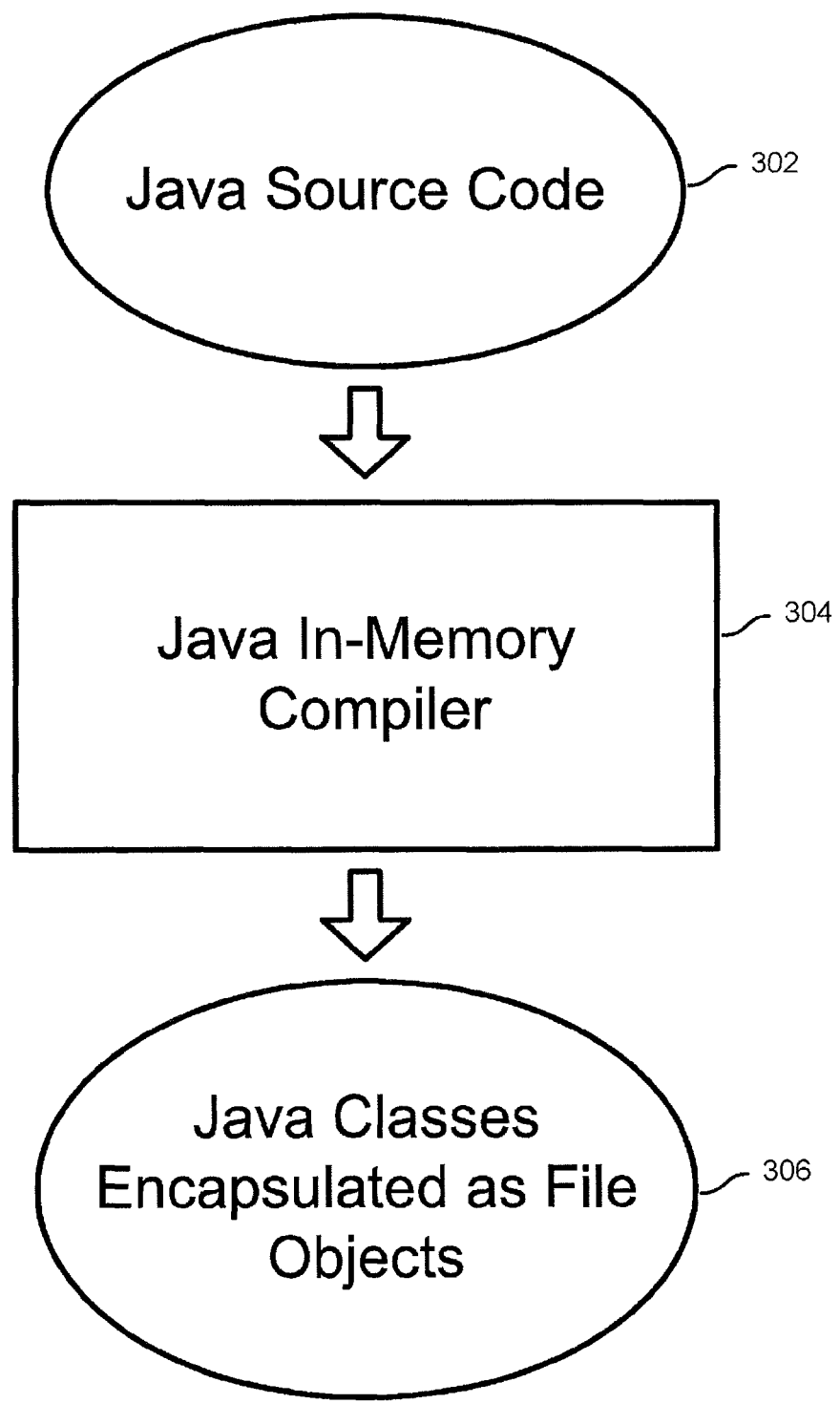
FIG. 3 is a block diagram illustrating an embodiment of a system that uses just in time compilation to deploy updated business processes.

FIG. 3 is a block diagram illustrating an embodiment of a system that uses just in time compilation to deploy updated business processes. In the example shown, a business process definition comprising Java source code 302 is provided to a Java in-memory compiler 304. In some embodiment, in memory compilation tools available in the Java Development Kit (JDK) version 6 and later may be used. The Java in-memory compiler 304 provides as output one or more Java classes 306 (e.g., Java byte code) encapsulated as file objects. Instances of the Java classes 306 may be created to provide instances of the business process defined and implemented by source code 302.

Figure 4:
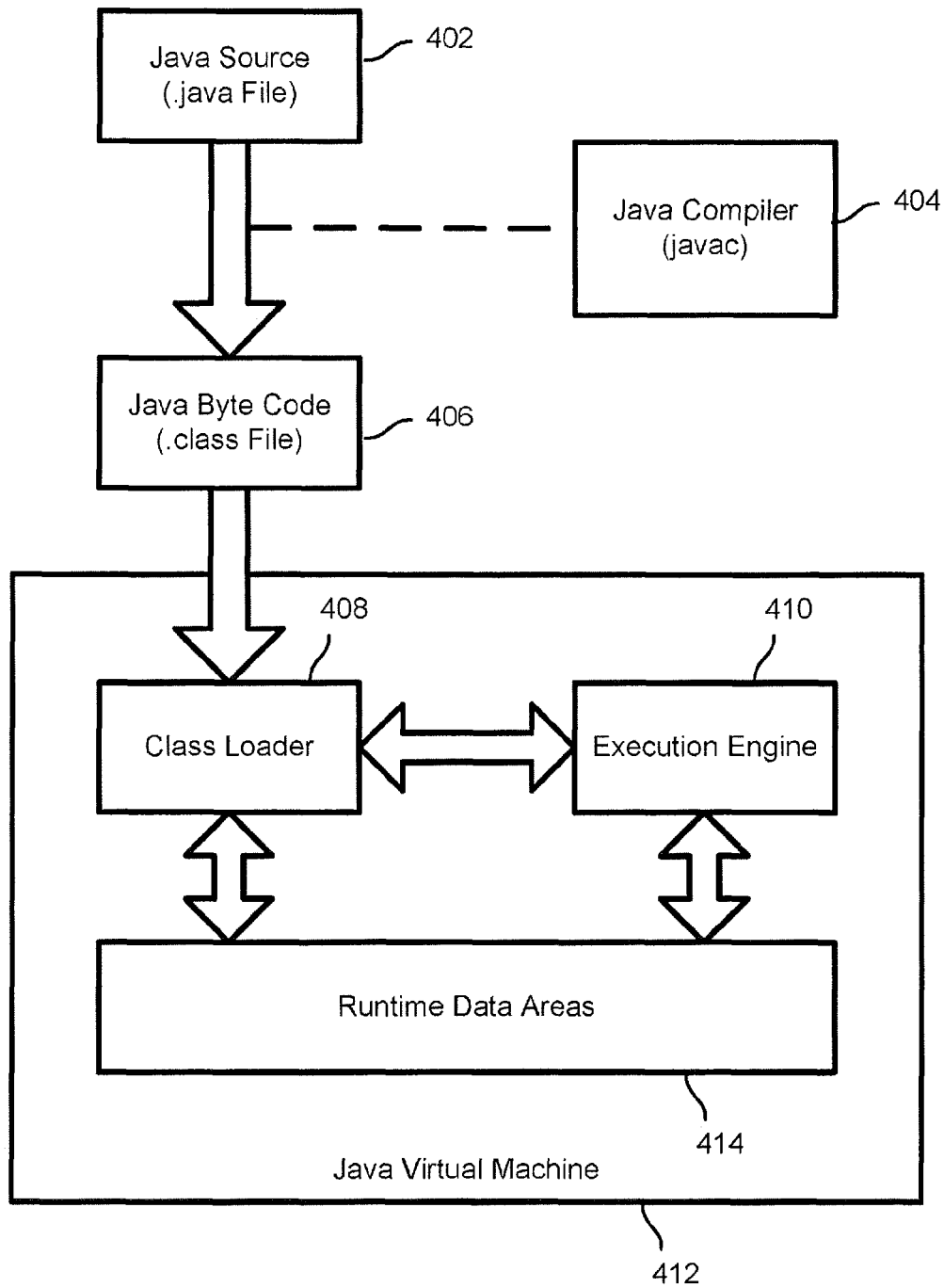
FIG. 4 is a block diagram illustrating an embodiment of a system that uses just in time compilation to deploy updated business processes.

FIG. 4 is a block diagram illustrating an embodiment of a system that uses just in time compilation to deploy updated business processes. In the example shown, Java (or other) source code 402 provided to implement and/or update a business process definition is compiled in memory by a Java in-memory compiler 404 to generate Java byte code 406 in the form of one or more Java classes (e.g., .class file(s)). In the example shown, the generated Java classes are provided to a class loader 408. The class loader 408 is associated with an execution engine 410, and both are associated with a Java virtual machine (JVM) 412, e.g., a runtime environment running on a computer system (e.g., server) at which instances of the business process are to be created and executed, such as but not limited to an environment like the one shown in FIG. 2. Running instances of the business process may store business process instance data in a runtime data area 414 of the JVM 412. In some embodiments, business process definition classes 406 may be loaded directly to a business process engine-associated class loader 408, an execution engine 410 may include a business process engine provided and realized within JVM 412, such as business process engine 112 of FIG. 1 and/or rules engine 208 of FIG. 2.

In various embodiments, JIT compilation of business process definition source code may be performed on a computer system or other node one or more key attributes may not be known at the time the business process definition source code is developed and/or deployed (e.g., to .ear or other archive, as shown in FIG. 1). However, as shown in FIGS. 3 and 4, for example, in various embodiments the input to the Java (or other) in-memory compiler includes one or more source files and the output provide by the compiler includes one or more class files. If the file system of the computer or other system at which compilation is to or may occur is unknown, a mechanism is needed to provide such input (source files) and receive and use the output (class files) without relying on the native file system of the computer or other system at which compilation occurs. In various embodiments, a "virtual" file system is defined and used. In some embodiments, a Java package or other hierarchical namespace is used to simulate a hierarchical (e.g., folder and subfolder-based) file system.

Figure 5:
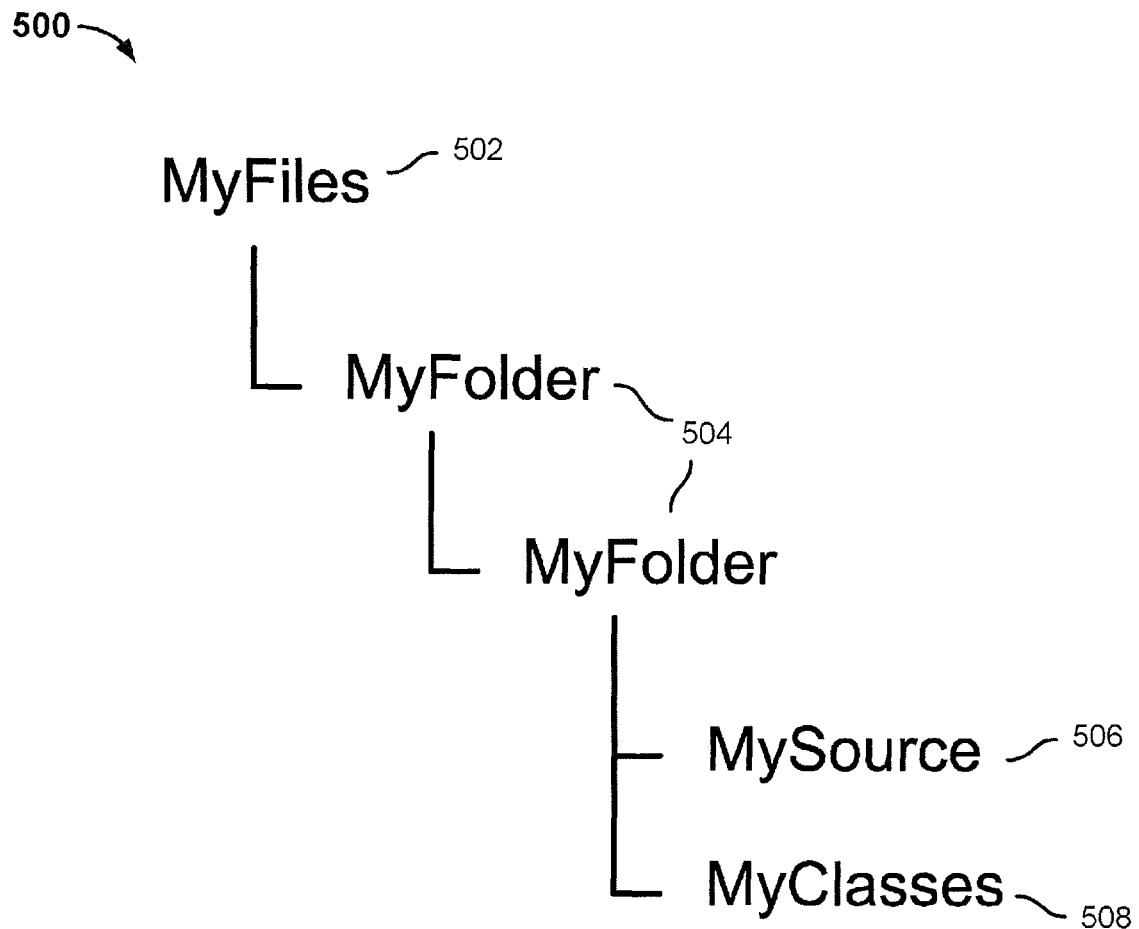
FIG. 5 is a block diagram illustrating an embodiment of a virtual file system used in some embodiments to facilitate the use of just in time compilation to deploy updated business processes.

FIG. 5 is a block diagram illustrating an embodiment of a virtual file system used in some embodiments to facilitate the use of just in time compilation to deploy updated business processes. In the example shown, a virtual file system 500 includes a virtual root node 502, virtual folder and sub-folder nodes 504, and within a lowest level virtual folder node 504 one or more "source" virtual file(s) and one or more "class" virtual file(s). In some embodiments, the virtual file system 500 is provided at least in part by defining custom file or other object "types" for each of one or more of the virtual file system root node 502, the virtual folder and sub-folders 504, the "source" files 506, and the "class" files 508. For example, in some embodiments the "source" files provided as input to the Java or other in-memory compiler are associated with a "source" custom file object type 506 and the class files 508 provided as output are associated with a "class" custom file object type.

In various embodiments, a hierarchical (e.g., Java package) namespace is used to implement the virtual file system 500 of FIG. 5, For examples, within a Java package as represented and stored in memory a source file to be compiled, e.g., one the location of which if in a folder structure may be MyFiles.MyFolder_A.MyFolder_B.business_process_C.mysource, may be identified using an associated name within a Java package namespace in which the source file in included. For example, if the programmer considers "MyFiles" to be the root folder, the programmer can choose to have the namespace start either at the root or any subfolder. If the namespace starts at the root, the package name would be "MyFolder_A.MyFolder_B" in this example. If the namespace starts at folder "MyFolder_A", the package name would be "MyFolder_B". In various embodiments, the package name is represented in the java source file with a package identifier in the form "package com.company_domain_name.xml;" and the java compiler/in-memory compiler is given the start of the namespace folder. The compiler then figures out how to navigate the namespace, e.g., a ReadXML.java can reside in a folder path:

--- projectXML/src/com/company_domain_name/xml/ReadXML.java
namespace root folder=projectXML/src
package namespace=com.company_domain_name.xml
Inside the file ReadXML.java it will start with package com.company_domain_name.xml.

---

By using a Java or other package hierarchical namespace to identify a source file as stored in memory, source file objects may be provided directly to the in-memory compiler from locations in which such files are stored in memory, without using the file system of the computer or other system at which compilation is performed. Likewise, the in-memory compiler may be instructed to store class files provided by the in-memory compiler as output in a location identified using the same package namespace. In various embodiments, class files stored in memory may then be provided directly as input to a business process engine or other class loader, enabling instances of the business process to be created and run within the business process engine, e.g., as described above.

Figure 6:
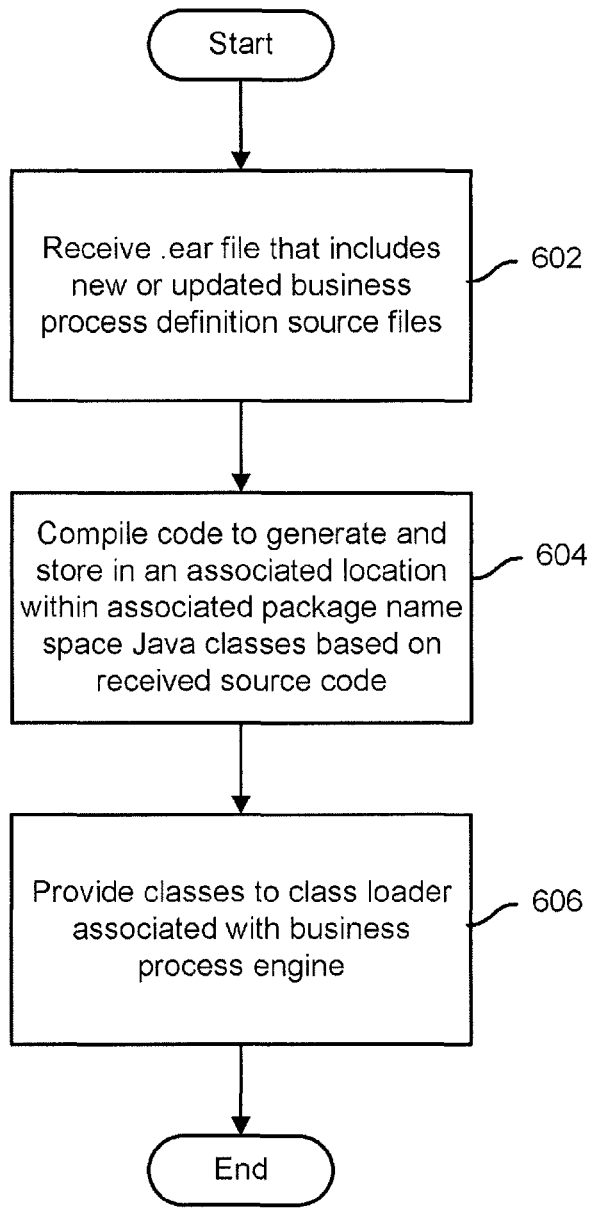
FIG. 6 is a flow chart illustrating an embodiment of a process to deploy updated business processes.

FIG. 6 is a flow chart illustrating an embodiment of a process to deploy updated business processes. In the example shown, a .ear or other archive file that includes source code to implement one or more new or updated business process definitions is received (602). The received code is compiled, using an in-memory compiler, to generate one or more class files, which are stored in a memory location associated with a Java or other package and identified using an associated Java or other package namespace (604). The classes, as stored in such location in memory, are provided to a class loader associated with a business process engine (606), for example by using the Java or other package namespace to identify to the class loader a location in memory in which the JIT compiled class file is stored.

Using techniques disclosed herein, updated and/or new business process definitions may be created and deployed efficiently, using JIT compilation, including without limitation at compilation nodes the file system or other attributes of which may not be known at the time source code written to implement the new or updated business process definition is created and deployed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing a business process, comprising:
   receiving, by a processor, a business process source file stored in a memory, wherein the business process is associated with the business process source file and the business process includes one or more related, structured activities or tasks;
   determining, by the processor, based at least in part on the business process source file a virtual file system that does not rely on a native file system of a computer system, wherein the virtual file system includes a hierarchical namespace;
   providing, by the processor, the business process source file as an input to a compiler during runtime;
   receiving, by the processor, from the compiler as output a business process compilation output file stored in the memory, wherein the business process compilation output file is stored in the memory based at least in part on the hierarchical namespace of the virtual file system, wherein the business process compilation output_file outputted by the compiler includes a new or updated version of the business process; and
   providing, by the processor, the business process compilation output file to a business process engine.

2. The method of claim 1, wherein receiving the business process source file includes retrieving from an archive storage node an archive file that includes the business process source file.

3. The method of claim 2, wherein receiving the business process source file further includes extracting the business process source file from the retrieved archive file and storing the business process source file in a memory location in the memory.

4. The method of claim 3, wherein the memory location in the memory location is associated with a package with which the archive file is associated.

5. The method of claim 4, further comprising identifying the memory location using a package namespace associated with the package.

6. The method of claim 5, wherein the memory location is identified at least in part by using a hierarchical name within the package namespace from which hierarchical name a place of the source file within the name hierarchy within the package namespace can be derived.

7. The method of claim 6, wherein the hierarchical name within the package namespace represents a virtual hierarchy of the virtual file system within which the source file comprises a virtual leaf node and in which one or more nodes higher than the source file within the hierarchy represent a virtual folder node in which the source file is virtually located.

8. The method of claim 7, wherein the source file comprises source code encapsulated as a file object.

9. The method of claim 8, wherein the file object comprises an object of a custom type defined to encapsulate source code within the virtual file system.

10. The method of claim 9, wherein the business process compilation output file is received as output at least in part by instructing the compiler to store the compilation output file in a memory location associated with the package namespace.

11. The method of claim 10, wherein the compilation output file is stored in a same level within the virtual hierarchy of the package namespace as the source file.

12. The method of claim 10, wherein the compilation output file comprises source code encapsulated as a file object.

13. The method of claim 12, wherein the source file object comprises an object of a first custom type and the compilation output file object comprises an object of a second custom type defined to encapsulate compiled code within the virtual file system.

14. The method of claim 13, wherein providing the business process compilation output file to the business process engine comprises providing to the business process engine an indication of a location of the compilation output file within the package namespace.

15. A computer system, comprising:
    a memory; and
    a processor coupled to the memory and configured to:
    receive a business process source file stored in the memory, wherein a business process is associated with the business process source file and the business process includes one or more related, structured activities or tasks;
    determine based at least in part on the business process source file a virtual file system that does not rely on a native file system of a computer system, wherein the virtual file system includes a hierarchical namespace;
    provide the business process source file as an input to a compiler during runtime;
    receive from the compiler as output a business process compilation output_file stored in the memory, wherein the business process compilation output file is stored in the memory based at least in part on the hierarchical namespace of the virtual file system, wherein the business process compilation output file outputted by the compiler includes a new or updated version of the business process; and
    provide the business process compilation output file to a business process engine.

16. The system of claim 15, wherein the processor is further configured to retrieve from an archive storage node an archive file that includes the business process source file.

17. The system of claim 16, wherein the processor is further configured to extract the business process source file from the archive file and store the business process source file in the memory in a memory location identified at least in part using a package namespace associated with a package with which the business process source file is associated.

18. The system of claim 17, wherein the memory location is identified at least in part using a hierarchical name within the package namespace and wherein the hierarchical name indicates a virtual hierarchical location of the business process source file within a virtual file system.

19. The system of claim 18, wherein the business process compilation output file is stored in the memory in a location associated with the package namespace at a same virtual hierarchical level within the virtual file system as the business process source file.

20. A computer program product to provide a business process, the computer program product being embodied in a tangible, non-transitory computer readable storage medium and comprising computer instructions for:

receiving a business process source file stored in a memory, wherein the business process is associated with the business process source file and the business process includes one or more related, structured activities or tasks;

determine based at least in part on the business process source file a virtual file system that does not rely on a native file system of a computer system, wherein the virtual file system includes a hierarchical namespace;

providing the business process source file as an input to a compiler during runtime;

receiving from the compiler as output a business process class file stored in the memory, wherein the business process class file is stored in the memory based at least in part on the hierarchical namespace of the virtual file system, wherein the business process class file outputted by the compiler includes a new or updated version of the business process; and providing the business process class file to a business process engine.

\* \* \* \* \*